Aug. 18, 1953   B. J. MILLER   2,649,312
FORK ATTACHMENT FOR SPRINGING BICYCLE WHEELS
Filed Jan. 18, 1951
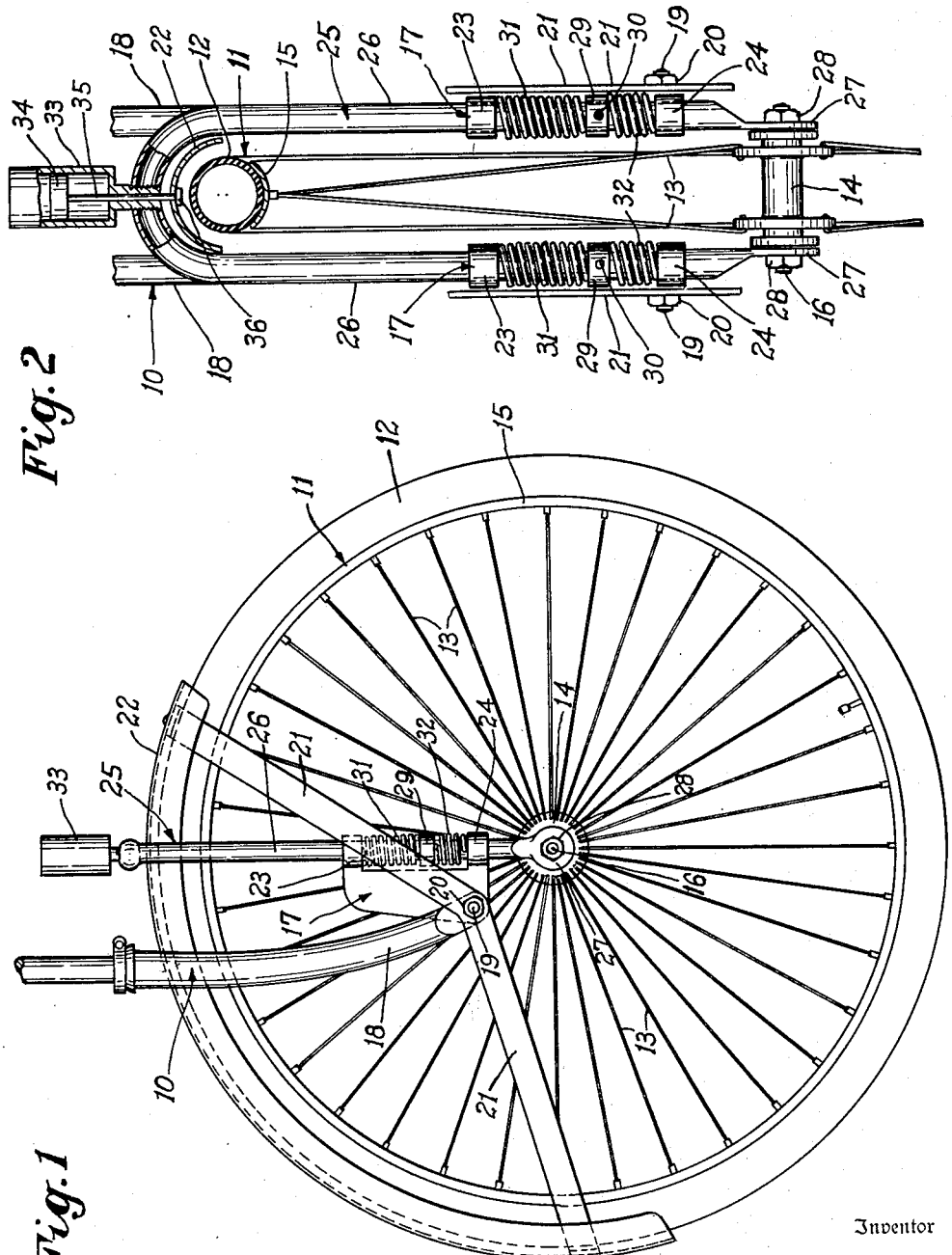
Inventor
Benjamin J. Miller
By Frease and Bishop
Attorneys

UNITED STATES PATENT OFFICE 2,649,312

FORK ATTACHMENT FOR SPRINGING BICYCLE WHEELS

Benjamin J. Miller, Alliance, Ohio

Application January 18, 1951, Serial No. 206,588

4 Claims. (Cl. 280—277)

The invention relates to spring suspensions for bicycles, and more particularly to an attachment interposed between the front fork and the front wheel of a bicycle for absorbing shock.

The object of the invention is to provide a shock absorbing device for bicycles, in the form of an attachment, which may be quickly and easily installed upon a conventional bicycle without requiring any change in the construction of the fork or wheel of the bicycle.

Another object is to provide such a spring fork attachment which may be quickly and easily installed, by disconnecting the front wheel axle from the front fork of the bicycle and interposing the spring fork absorbing attachment between the front fork and the front wheel axle.

A further object is to provide such a device including a pair of bearing brackets adapted to be connected to the front fork and a yoke or inverted U-shape rod slidably connected to the brackets and adapted to be connected to the front wheel axle, spring means being interposed between the yoke rod and the brackets.

A still further object is to provide a shock absorbing spring fork attachment of the character referred to in which the yoke or U-shape rod carries a shock absorbing cylinder, the piston of which is connected to the fender of the front wheel for further absorbing shock when the front wheel of the bicycle strikes an obstruction in the roadway.

The above objects together with others which will be apparent from the drawing and following description, or which may be later referred to, may be attained by constructing the improved spring fork attachment in the manner hereinafter described in detail and illustrated in the accompanying drawing, in which;

Figure 1 is a vertical elevation of the front wheel of a bicycle and the front fork thereof showing the improved spring fork attachment mounted thereon; and, Fig. 2 is a vertical sectional view through the same on an enlarged scale.

Referring to the embodiment of the invention illustrated in the drawing, the conventional front fork of a bicycle is indicated generally at 10, and a conventional bicycle front wheel is indicated generally at 11, provided with the usual tire 12, spokes 13, hub 14 and rim 15.

Under usual and well known practice the axle 16, of the front wheel 11, is connected to the forward, lower ends of the furcations 18 of the fork 10. In order to install the improved spring fork attachment to which the invention pertains, the front axle 16 is disconnected from the furcations 18 of the fork 10, and a guide bearing bracket, indicated generally at 17, is connected to each furcation 18, of the front fork 10, as by a bolt 19 and nut 20.

This bolt and nut may also connect the braces 21, of the conventional wheel fender 22, to the fork 10, in the same manner that these braces are ordinarily connected to the fork by means of the front axle.

Each bracket 17 is provided with the spaced, upper and lower guide bearings 23 and 24 respectively. The yoke, or inverted U-shape rod 25, which is preferably formed of a metal tube, has the two depending legs 26, one of which is slidably located through the guide bearings 23 and 24 of each bracket 17.

The lower ends of the depending legs 26, of the yoke, may be flattened and enlarged, as at 27, for connecting to the front axle 16, as by the usual nuts 28.

A collar 29 is adjustably mounted upon each leg 26 of the yoke, as by a tapered pin 30, at a point intermediate the upper and lower guide bearings 23 and 24. A coil spring 31 is located between each collar 29 and the upper guide bearing 23, and a coil spring 32 is located between each collar 29 and the corresponding lower guide bearing 24.

For the purpose of providing further means for absorbing shock, when the front wheel of the bicycle strikes an obstruction in the roadway, a shock absorber cylinder 33 is fixed to the upper end of the yoke 25, and the piston 34 thereof is provided with a piston rod 35, connected to the wheel fender 22, as indicated at 36 in Fig. 2.

To better understand the principle made use of in this invention, and the manner of operation thereof, the unsprung front wheel of an ordinary bicycle may be used as an illustration. In such case the axle of the front wheel is rigidly connected to the front fork of the bicycle.

As the front wheel strikes an obstacle, the line of reaction passes through the contact point of the wheel with the obstacle, and through the center of the wheel axle, in a rearwardly and upwardly disposed oblique line.

If this line be taken as representating the force of the reaction, then the vertical component extending straight upward from the center of the wheel, and the horizontal component extending straight backward therefrom, are equivalent to the force of the reaction.

The vertical component is a deflecting force, as it acts at right angles to the direction of travel, and the wheel may therefore yield to it by rising and surmounting the obstacle, although there will be considerable shock to the rider of the bicycle as the wheel surmounts the obstacle.

The horizontal component, however, acts in the direction opposite to the direction of travel, and since the wheel cannot yield in that direction, this force must be absorbed as shock, i. e. dissipated in the form of heat and mechanical abrasion. Therefore, it appears desirable to reduce the effect of shock and wear by cushioning the connection between the wheel axle and the fork of the frame.

The functional effectiveness of this mechanism may be more clearly understood by considering the following: the reaction from an obstacle is not instantaneous, but, starting at the instant of impact, when its force is at maximum, the reaction continues its force decreasing the while, until the wheel is atop the obstacle, at which point the reaction force ceases, or becomes equal to zero.

The direction of the reaction line, at any instant, of course corresponds with the line which passes through the effective contact point of the wheel with the obstacle, and through the center of the wheel axle.

It is now to be noted that, as the wheel surmounts the obstacle, the direction of the reaction line shifts from its initial position progressively toward the vertical, and that as the wheel reaches the top position the reaction line reaches the vertical. With applicant's design of spring fork attachment it will be obvious that shock-loss is kept to a minimum throughout the duration of the occurrence of the reactive force.

In the operation of the improved spring fork attachment it will thus be obvious that, as the front wheel strikes an obstacle in the road, the wheel will rise, and through it the yoke 25 will rise vertically, and the shock and rebound will be absorbed by the springs 31 and 32 respectively, so that this shock will not be transmitted to the front fork 10. It will be seen that the shock will be further absorbed by the piston 34, located within the shock absorber cylinder 33.

I claim:

1. In combination with a bicycle fork, a guide bearing bracket attached to each furcation of said fork, a yoke having a depending leg slidably mounted through each guide bearing bracket, a bicycle wheel, an axle for said wheel, means connecting the ends of the axle to the ends of said depending legs of the yoke, and spring means interposed between each depending leg of the yoke and the corresponding guide bearing bracket, a wheel fender rigidly attached to said fork, a cylinder carried by said yoke, and a piston located in said cylinder and attached to said wheel fender, so as to provide a spring suspension for said wheel.

2. In combination with a bicycle fork, a guide bearing bracket attached to each furcation of said fork, spaced upper and lower guide bearings on each bracket, a yoke having a depending leg slidably mounted through each guide bearing bracket, a bicycle wheel, an axle for said wheel, means connecting the ends of the axle to the ends of said depending legs of the yoke, a collar upon each depending leg between said guide bearings, and spring means interposed between the collar of each depending leg of the yoke and the corresponding upper guide bearing of the corresponding bracket, a wheel fender rigidly attached to said yoke, a cylinder carried by said yoke, and a piston located in the cylinder and attached to said wheel fender, so as to provide a spring suspension for said wheel.

3. In combination with a bicycle fork, a guide bearing bracket attached to each furcation of said fork, spaced upper and lower guide bearings on each bracket, a yoke having a depending leg slidably mounted through each guide bearing bracket, a bicycle wheel, an axle for said wheel, means connecting the ends of the axle to the ends of said depending legs of the yoke, a collar upon each depending leg between said guide bearings, and spring means interposed between each collar and the upper and lower guide bearings of the corresponding bracket, a wheel fender rigidly attached to said fork, a cylinder carried by said yoke, and a piston located in the cylinder and attached to said wheel fender, so as to provide a spring suspension for said wheel.

4. In combination with a bicycle fork, a guide bearing bracket attached to each furcation of said fork, a yoke having a depending leg slidably mounted through each guide bearing bracket, a bicycle wheel, an axle for said wheel, means connecting the ends of the axle to the ends of said depending legs of the yoke, spring means interposed between each depending leg of the yoke and the corresponding guide bearing bracket, a guide member attached to the upper end of the yoke, a rod slidable in said guide member, and support means for said rod rigidly attached to the fork.

BENJAMIN J. MILLER.

References Cited in the file of this patent

UNITED STATES PATENTS

| Number | Name | Date |
|---|---|---|
| 739,476 | Becker | Dec. 26, 1902 |

FOREIGN PATENTS

| Number | Country | Date |
|---|---|---|
| 7,316 | Great Britain | Mar. 23, 1909 |
| 20,894 | Switzerland | Feb. 7, 1900 |
| 94,349 | Switzerland | Aug. 16, 1922 |
| 128,391 | Great Britain | June 18, 1919 |